US010807605B2

(12) United States Patent  
Hutchings et al.

(10) Patent No.: US 10,807,605 B2  
(45) Date of Patent: Oct. 20, 2020

(54) SYSTEMS AND METHODS FOR DETECTING AND DYNAMICALLY MITIGATING DRIVER FATIGUE

(71) Applicant: Waymo LLC, Mountain View, CA (US)

(72) Inventors: Keith Hutchings, San Jose, CA (US); Julien Mercay, Redwood City, CA (US); Philip Nemec, San Jose, CA (US); Hans-olav CaveLie, San Francisco, CA (US); Saswat Panigrahi, Mountain View, CA (US); Renaud-Roland Hubert, Gilroy, CA (US); Johan Engstrom, Los Gatos, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 16/226,322

(22) Filed: Dec. 19, 2018

(65) Prior Publication Data

US 2020/0198644 A1  Jun. 25, 2020

(51) Int. Cl.
*B60W 40/09* (2012.01)
*G06K 9/00* (2006.01)
*G05D 1/00* (2006.01)
*G06F 3/01* (2006.01)

(52) U.S. Cl.
CPC .......... *B60W 40/09* (2013.01); *G05D 1/0088* (2013.01); *G06F 3/013* (2013.01); *G06K 9/00845* (2013.01); *G05D 2201/0213* (2013.01)

(58) Field of Classification Search
CPC ................ B60W 40/09; G05D 1/0088; G05D 2201/0213; G06F 3/013; G06K 9/00845
See application file for complete search history.

(56) References Cited

U.S. PATENT DOCUMENTS

| 7,692,549 | B2 | 4/2010 | Bonefas et al. |
| 9,493,118 | B1 | 11/2016 | Laur et al. |
| 9,671,782 | B2 | 6/2017 | Yamaoka et al. |

(Continued)

FOREIGN PATENT DOCUMENTS

JP  2005004414 A  1/2005

OTHER PUBLICATIONS

International Search Report and Written Opinion for Application No. PCT/US2019/066739 dated Apr. 28, 2020.

*Primary Examiner* — Mohamed Barakat
(74) *Attorney, Agent, or Firm* — Botos Churchill IP Law

(57) ABSTRACT

This technology relates to dynamically detecting, managing and mitigating driver fatigue in autonomous systems. For instance, interactions of a driver in a vehicle may be monitored to determine a distance or time when primary tasks associated with operation of the vehicle or secondary tasks issued by the vehicle computing were last performed. If primary tasks or secondary tasks are not performed within given distance thresholds or time limits, then one or more secondary tasks are initiated by the computing device of the vehicle. In another instance, potential driver fatigue, driver distraction or overreliance on an automated driving system is detected based on gaze direction or pattern of a driver. For example, a detected gaze direction or pattern may be compared to an expected gaze direction or pattern given the surrounding environment in a vicinity of the vehicle.

16 Claims, 10 Drawing Sheets

(56) References Cited

U.S. PATENT DOCUMENTS

| | | | |
|---|---|---|---|
| 2013/0131907 A1* | 5/2013 | Green | G05D 1/0055 |
| | | | 701/23 |
| 2014/0218188 A1 | 8/2014 | Kim et al. | |
| 2016/0207455 A1 | 7/2016 | Kim | |
| 2017/0247040 A1 | 8/2017 | Miller et al. | |
| 2018/0039283 A1* | 2/2018 | Srivastava | G01S 7/003 |
| 2018/0041628 A1* | 2/2018 | Shannir | H04M 1/72577 |
| 2018/0284764 A1 | 10/2018 | Asghar et al. | |
| 2018/0319408 A1 | 11/2018 | Hoetzer | |
| 2019/0213429 A1* | 7/2019 | Sicconi | G06K 9/00597 |

* cited by examiner

300A

300B

SYSTEMS AND METHODS FOR DETECTING AND DYNAMICALLY MITIGATING DRIVER FATIGUE

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location. However, in some situations a human driver may be located within the compartment of the vehicle. In such situations the driver may need to assist in operation of the vehicle or assist a passenger in some way ("assist driver"). With regard to the former, this may occur, for example, during test runs of a vehicle. With regard to the latter, such situations may occur where, for example, a passenger has a problem or is concerned or otherwise uncomfortable. Here, a human driver in the vehicle may communicate with the passenger and reassure him or her that the vehicle is functioning normally, check on the passenger during the ride, and/or provide instructions to the passenger in the event of a problem with the vehicle or an emergency. As the assist driver may not always be cognitively engaged during a drive, he or she may become fatigued, engage in distracting tasks or possibly over-rely on automation. And while the foregoing has been discussed in respect of autonomous vehicles, such fatigue may also become a factor for drivers operating non-autonomous vehicles.

BRIEF SUMMARY

One aspect of the disclosed technology provides a dynamic interactive cognitive task method for a self-driving system. The method comprises determining, by one or more processors of the self-driving system, a primary task demand metric associated with a primary task; and comparing, by the one or more processors, the primary task demand metric to a threshold value. The method may also comprise triggering, by the one or more processors, the self-driving system to initiate an interactive cognitive task to a driver of the self-driving system based on a result of the comparison.

In this aspect of the technology, the primary task demand metric comprises a value associated with one of a comment by the driver, a comment rating, or a request for use of the self-driving system for a passenger of the self-driving system. In addition, as an example, the threshold value comprises a time threshold value of at least 10 minutes. The threshold value may also comprise a distance threshold value of at least 10 miles.

Further, triggering the interactive cognitive task comprises initiating a task that requires a response from the driver. In addition, initiating a task that requires the response may comprise initiating a task that requires use of a motor skill and a cognitive skill as part of the response from the driver.

As a further example, triggering the interactive cognitive task may comprise generating a voice request for the driver to complete a non-visual button push task.

The method may also further comprise monitoring, by the self-driving system, for a response from the driver to the initiated interactive cognitive task and issuing a follow-up interactive cognitive response if there is no response within a predetermined time limit.

In additional examples, the method may further comprise determining complexity of the interactive cognitive task based on at least a complexity of the primary event. Furthermore, a frequency associated with triggering the self-driving system to initiate the interactive cognitive task is adjustable based on the result of the comparison. The method may also further comprise cancelling the interactive cognitive task if another primary task event is detected by the self-driving system within a time limit. In addition, the primary task demand metric may comprise at least one of a time travelled by the self-driving system or a distance traveled by the self-driving system.

In another aspect, the technology provides dynamic interactive cognitive task method for a self-driving system, comprising: monitoring, by one or more processors of the self-driving system, a primary task demand metric associated with at least one primary task; comparing, by the one or more processors, the monitored primary task demand metric to a threshold; and initiating, by the one or more processors, using the self-driving system an interactive cognitive task based on a result of the comparison.

Further in accordance with this aspect of the technology, the primary task demand metric comprises a distance travelled since performance of a primary task demand event by a driver of the self-driving system. Additionally, the primary task demand metric comprises an elapsed time since performance of a primary task demand event by a driver of the self-driving system. The primary task demand metric may also comprise one of a comment by the driver, a comment rating, or a request for use of the self-driving system for a passenger.

In another aspect, the technology comprises a method for managing driver inattention. The method may comprise acquiring, by one or more processors, images of one or both of a driver's eyes to determine an actual gaze direction or pattern of the driver; determining, by the one or more processors, an expected gaze direction or pattern of the driver based on a planned route of the vehicle and objects in an external environment of the vehicle; and comparing, by the one or more processors, the actual gaze direction or pattern to the expected gaze direction or pattern. The method also comprise taking corrective action upon determining that the driver's visual scanning of the driving environment indicates driver inattention.

Further in accordance with this aspect of the technology, determining whether the driver's visual scanning of the driving environment deviates from the expected gaze direction or pattern may comprise using a normative model based on environmental statistics to determine the expected gaze direction or pattern given a planned driving path. Determining whether the driver's visual scanning of the driving environment deviates from the expected gaze direction or pattern may also comprise using a normative model based on human visual behavior statistics to determine the expected gaze direction or pattern.

Further still, acquiring images may comprise monitoring one or both of the driver's eyes for eye closure. In addition, the driver may comprise a driver of a non-autonomous vehicle or an assist driver monitoring the operations of an autonomous vehicle

DETAILED DESCRIPTION

Overview

Figure 1:
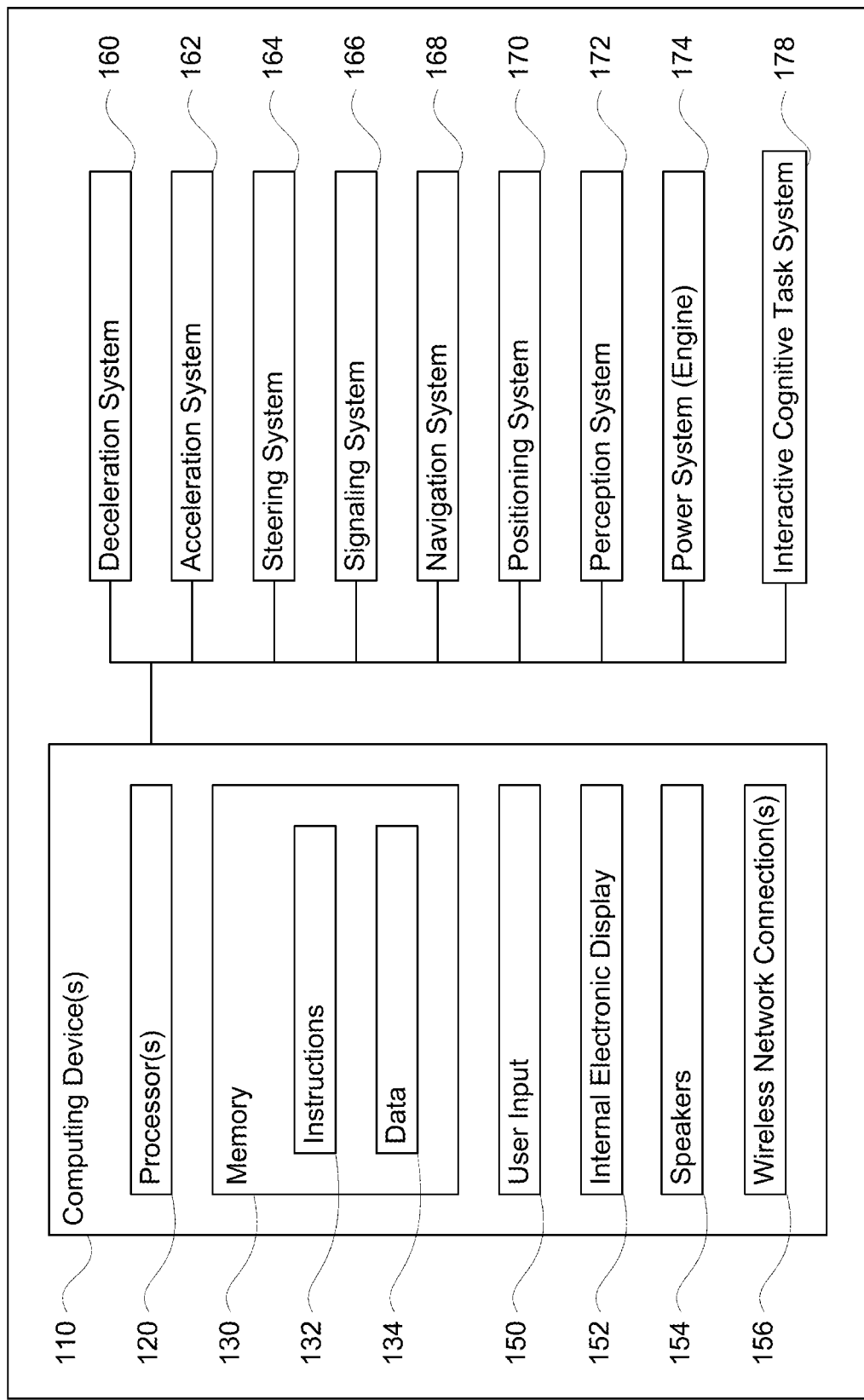
FIG. 1 is a functional diagram of an example vehicle in accordance with aspects of the disclosure.

The technology relates to detecting, managing and mitigating driver fatigue and distraction in autonomous systems. Some autonomous systems require human oversight. For example, in a vehicle capable of partially or fully autonomous driving or self-driving system (SDS), an assist or safety driver may ride in the compartment of the vehicle to monitor and provide oversight of the vehicle's operation. The assist driver may experience passive fatigue, e.g., fatigue due to under-stimulation or underload, as autonomous vehicles will typically require less or perhaps no interaction on the part of the assist driver for primary tasks associated with vehicle operation, e.g., monitoring the SDS. As such, the risk of producing passive fatigue, as well as other phenomena inducing inattention to the automation monitoring task such as driver distraction and over-reliance on the automation, increases. This may result in a corresponding reduction in the ability of the assist driver to take over a primary task associated with vehicle operation if needed.

In one instance, one or more computing devices in a vehicle or SDS that introduces secondary tasks or so called interactive cognitive tasks (ICTs) in relation to primary task demand (the level of interactivity of the assist driver) may provide a dynamic approach in reducing and/or avoiding passive fatigue in autonomous systems. More specifically, one or more computing devices may monitor and/or receive information regarding the performance of primary tasks associated with operating a SDS vehicle and secondary tasks performed by a driver with the SDS. Performance of primary tasks and/or secondary tasks may be measured via a metric such as primary task demand, which provides a measure of the level of driver interactivity. The computing device(s) may then systematically vary secondary tasks in relation to primary task demand. For example, a time threshold or a distance threshold may be associated with primary task demand. If the driver has not interacted with the SDS within a time threshold or a distance threshold, the computing device(s) may then trigger a secondary task or ICT.

Primary task demand may be based on the following interactivity markers: comment, driving quality assessment, being within a customer trip. The comment marker may include a measure of the interactivity time period (e.g., the elapsed time since the assist driver last interacted with the SDS). Driving quality assessment may be a measure of the importance of a comment from the assist driver. Being within a customer trip is a measure of requests for use of the self-driving system for a passenger. Other indicators of task demand may include driving conditions such as speed, road complexity, and/or proximity to cars and pedestrians; this and other aspects of environmental complexity may also be used in inferring primary task demand. Secondary tasks or ICTs in general comprise activities that may engage a driver's motor skills or cognitive skills. Examples of ICTs include requiring the driver to press a specific button (e.g., volume up) in response to a voice request. In this example, the pressing of the button engages a motor skill, while understanding the voice request engages a cognitive skill. Other ICTs may include any other appropriate vehicle control, e.g., turning wiper blades on/off, tuning the radio to a specific radio station, etc.

As a working example, a time threshold may be set to 20 minutes (or more or less) since last driver interaction, or 10 miles (or more or less) since last driver interaction. The computing device may periodically poll the SDS to determine driver interaction and receive feedback on primary task demand. If the driver has not interacted within 20 minutes or 10 miles, then the computing device or SDS may cause an ICT to be triggered. An ICT may comprise a voice request that prompts the driver to complete a task that requires pushing or, more generally, movement of a specific physical or on-screen button. If the driver does not respond to the ICT within a predetermined time limit (e.g., 10 seconds) or responds incorrectly, then the computing device or, more generally, SDS may issue another or follow-up ICT. If no response or an incorrect response is received to the follow-up ICT, the SDS or computing device may initiate additional action.

Such additional action may include alerting a dispatcher so that the dispatcher may reach out to the driver or activate a video monitoring system to determine the state of driver alertness. Other actions may include sounding a distinctive alarm intended to awake even a sleeping driver, playing loud music or vibrating the driver's seat. Note too that the ICT triggering criteria may be adjusted depending on a driver's ICT performance history, such that drivers with recent errors/misses or slower response times may receive more frequent ICTs. The dispatcher or SDS may also suggest countermeasures that promote driver alertness such as, for example, taking a break, stretching, etc. When ICT performance indicates that fatigue is high, more aggressive countermeasures such as pulling the vehicle over may be initiated.

In general, this technology allows for an increase in secondary task demand to be inversely proportional to primary task demand. For example, if the vehicle's operation requires more vigilant attention and thus primary task demand is relatively higher (e.g., driving in a busy intersection), secondary task demand and the frequency of ICTs may be decreased to make it easier for the driver to focus on the primary task. Conversely, if primary task demand is low (e.g., driving on a deserted highway), the frequency and complexity of ICTs may be increased. Increasing complexity may comprise requiring more complicated motor skills to complete a voice request (e.g., move a button in a first direction and the same or a different button in a second direction). Because primary task demand is an input in determining whether to initiate secondary tasks or ICTs, the system may avoid initiating secondary tasks or ICTs when the driver is engaged in primary tasks.

While the examples above provide a fixed time and/or distance as a threshold, the threshold may also vary in complexity and frequency based on the operating conditions of the vehicle or a profile of a driver. For example, if the SDS or computing device determines that the vehicle has traversed the distance threshold in an usually fast time (e.g., 10 miles in under 8 minutes correlates to a speed of 80 m.p.h.), that may be considered an indication that the vehicle is travelling at higher speed and therefore ICTs may need to be issued more frequently depending on the perceived attentiveness level of the assist driver. In addition, if the driver's profile indicates that the driver gets bored more quickly on highway drives, the frequency and complexity of ICTs may be increased to keep such a driver more fully engaged. The complexity and frequency may also be varied based on driver experience. For example, for a new driver, ICTs may be triggered more frequently during training or as compared to a more experienced driver. ICT frequency and complexity may be varied also by time of day (e.g., fatigue may vary with the time of day), proximity to meal times or proximity to breaks.

The complexity of a driving context may also serve as input in determining the timing or complexity of ICTs. For example, the occurrence of ICTs may be timed so that they occur after, but not during, driving situations or context where the assist driver should be engaged with the operation of the vehicle. For example, the occurrence of an ICT may be timed to occur after, but not while, the car is traversing an intersection. Or an ICT might occur while a car is stopped at a red light. In addition, as the route of an autonomous vehicle is known, ICTs could also be triggered prior to the occurrence of complex driving scenarios, thereby having initiation of one or more ICTs occur prior to higher complexity driving contexts. Other inputs may include map data, road geometry and objects around the vehicle. In this way, an ICT may help boost vigilance prior to higher complexity driving contexts.

In another aspect, the technology relates to passively detecting driver fatigue of an assist driver in a vehicle configured to operate in a fully or partially autonomous mode, or configured for manual operation. Gaze patterns may serve as a reliable indicator of cognitive states, such as for example distractions. Gaze patterns may also serve as a reliable indicator of fatigue. For instance, a fatigued driver typically does not vigilantly monitor the road but rather gazes in one direction, e.g., straight ahead. An autonomous vehicle includes sensors and systems that can detect objects, etc., surrounding the vehicle and derive scene understanding with respect to the vehicle, and may be able to detect the direction of the driver's gaze. As such, one or more computing devices of the vehicle may determine one or more expected gaze direction, including an expected or normative gaze direction, pattern of directions, group of directions or sequence of directions (collectively referred to herein as "gaze direction or patterns"), for a driver based on the derived scene understanding. If the driver is not looking in an expected gaze direction or pattern on one or more occasions, such as if the driver's gaze patterns are not well correlated with an expected gaze pattern, this may serve as an indicator of passive fatigue.

For example, if a scene understanding derived from the vehicle's perception system indicates that based on naturally occurring stimuli outside the vehicle a driver should be looking in a particular direction, the actual gaze direction or pattern of the driver may then be compared to that particular direction or pattern to provide a measure of the driver's attentiveness and thus passive fatigue. As a further example, if the driver is making a right turn, the driver would be expected to be mainly looking to the left for oncoming traffic. However, if the detected gaze direction or pattern of the driver indicates that the driver is looking straight ahead that may signal that the driver is no longer sufficiently engaged in the driving task (e.g., due to low vigilance or fatigue). As the system can tell when and where drivers are expected to be looking, it allows for dynamically assessing a driver's vigilance and/or fatigue passively. The actual gaze direction (or pattern of gaze direction) may be detected through use of cameras within the compartment of the vehicle.

Different models may be used to determine and/or allocate where a driver should be looking given the visual stimuli in the field of view. Such normative models of visual scanning may be based on recorded attention allocation behavior of human drivers (using fatigue data as well as attentive driving data) but may also be derived from driving environment statistics. The models may use machine learning, or other statistical techniques, to learn the statistical properties of such data in order to determine the appropriate gaze direction or pattern of a driver, e.g., an assist driver, in a given driving scenario. A normative scanning model based on human data may be established by training the model to reproduce the visual scanning patterns associated with attentive drivers in similar scenarios. Alternatively, the normative scanning model may be established based on environmental statistics according to the following principles: The driving situation will typically comprise a planned path and the surrounding objects and road infrastructure elements of relevance for the planned path. The statistical properties may include, for example, locations at which other objects or road infrastructure elements will typically appear relative to the planned path, the frequency of those locations, the speed at which the object will approach those locations and/or the behavior of such objects as they approach those locations, etc. Such statistical properties may be modeled based on data collected while operating a fleet of autonomous vehicles as is described below. An expected scanning model may therefore be developed for a given situation and used as a benchmark against which a measured visual scanning pattern of actual drivers may be evaluated. In this way, deviations between the expected gaze direction or pattern of a driver based on the normative scanning model may be compared to the driver's actual gaze direction or pattern as measured by a video, still camera, or other gaze detection system in the vehicle to determine whether the driver is properly allocating his attention or gaze direction. Other models (e.g., machine learning models) may be used to provide similar input regarding expected or normative gaze direction or patterns for comparison with actual gaze direction and patterns.

The above features provide for dynamically detecting, monitoring and management of passive driver fatigue in SDS or autonomous vehicles. The system allows for monitoring of driver fatigue state by detecting the actual gaze direction and comparing it to where the driver should be looking, e.g., an expected or normative gaze direction or pattern. A deviation between the actual gaze direction or pattern and expected or normative gaze direction or pattern may then be used as an indicator that the driver may be fatigued and to trigger an increase in the cognitive load on the driver. The system also allows for monitoring and assessment of driver state using driver interactivity patterns (e.g., engaged versus not engaged) and then using that assessment to determine the need for increasing the cognitive load of the driver. The dynamic nature of the technology also makes it safer as secondary task demands are avoided when drivers are engaged (e.g., during periods when primary task demand is relatively high). The technology is dynamic not only in the manner which ICTs or secondary tasks are initiated, but also in that the system allows the complexity and frequency of ICTs to dynamically adjust according to primary task demand and/or vehicle operating conditions. The monitoring aspect of the system may be used to more reliably determine the fatigue state of the driver, which may then be used as trigger for ICTs. Thus, the monitoring system and management system (e.g., issuing tasks) may be used collaboratively to complement each other.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. As an example, data 134 of memory 130 may store predefined scenarios. A given scenario may identify a set of scenario requirements including a type of object, a range of locations of the object relative to the vehicle, as well as other factors such as whether the autonomous vehicle is able to maneuver around the object, whether the object is using a turn signal, the condition of a traffic light relevant to the current location of the object, whether the object is approaching a stop sign, etc. The requirements may include discrete values, such as "right turn signal is on" or "in a right turn only lane", or ranges of values such as "having an heading that is oriented at an angle that is 20 to 60 degrees offset from a current path of vehicle 100." In some examples, the predetermined scenarios may include similar information for multiple objects.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. As an example, internal electronic display 152 may be controlled by a dedicated computing device having its own processor or central processing unit (CPU), memory, etc. which may interface with the computing device 110 via a high-bandwidth or other network connection. In some examples, this computing device may be a user interface computing device which can communicate with a user's client device. Similarly, the memory may be a hard drive or other storage media located in a housing different from that of computing device 110. Accordingly, references to a processor or computing device will be understood to include references to a collection of processors or computing devices or memories that may or may not operate in parallel.

Computing device 110 may include all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing device 110 to provide information to passengers within the vehicle 100. The vehicle may also include one or more wireless network connections 156 to facilitate communicates with devices remote from the vehicle and/or between various systems of the vehicle.

In one example, computing device 110 may be an autonomous driving computing system incorporated into vehicle 100. The autonomous driving computing system may be capable of communicating with various components and systems of the vehicle, for instance, wirelessly (via wireless network connections 156) and/or a wired connection (such as a controller area network (CAN) bus or other communication bus). For example, computing device 110 may be in communication with various systems of vehicle 100, such as deceleration system 160 (for controlling braking of the vehicle), acceleration system 162 (for controlling acceleration of the vehicle), steering system 164 (for controlling the orientation of the wheels and direction of the vehicle), signaling system 166 (for controlling turn signals), navigation system 168 (for navigating the vehicle to a location or around objects), positioning system 170 (for determining the position of the vehicle), perception system 172 (for detecting objects in the vehicle's environment), and power system 174 (for example, a battery and/or gas or diesel powered engine) in order to control the movement, speed, etc. of vehicle 100 in accordance with the instructions 132 of memory 130 in an autonomous driving mode which does not require or need continuous or periodic input from a passenger of the vehicle. In addition to these systems, the computing device may be in communication with an interactive cognitive task (ICT) system 178 (for detecting and tracking driver fatigue, as well as cognitive and other task oriented interactions with the vehicle 100, the time or distance between such interactions, etc.). The ICT system may use signals from a video or still camera, buttons, switches, dials or other actuators, and other components within the interior of the car to perform its function. Although these systems are shown as external to computing device 110, in actuality, these systems may also be incorporated into computing device 110, as an autonomous driving computing system for controlling vehicle 100. In addition or alternatively, each of these systems may include one or more computing devices having processors and memory, configured the same as or similarly to processors 120 and memory 130 of computing devices 110 in order to enable the functionalities of these systems as described here.

The computing device 110 may control the direction and speed of the vehicle by controlling various components. By way of example, computing device 110 may navigate the vehicle to a destination location completely autonomously using data from the map information and navigation system 168. Computing devices 110 may use the positioning system 170 to determine the vehicle's location and perception system 172 to detect and respond to objects when needed to reach the location safely. In order to do so, computing devices 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

As an example, computing device 110 may interact with deceleration system 160 and acceleration system 162 in order to control the speed of the vehicle. Similarly, steering system 164 may be used by computing device 110 in order to control the direction of vehicle 100. For example, if vehicle 100 configured for use on a road, such as a car or truck, the steering system may include components to control the angle of wheels to turn the vehicle. Signaling system 166 may be used by computing device 110 in order to signal the vehicle's intent to other drivers or vehicles, for example, by lighting turn signals or brake lights when needed.

Navigation system 168 may be used by computing device 110 in order to determine and follow a route to a location. In this regard, the navigation system 168 and/or data 134 may store map information, e.g., highly detailed maps that computing devices 110 can use to navigate or control the vehicle. As an example, these maps may identify the shape and elevation of roadways, lane markers, intersections, crosswalks, speed limits, traffic signal lights, buildings, signs, real time or historical traffic information, vegetation, or other such objects and information. The lane markers may include features such as solid or broken double or single lane lines, solid or broken lane lines, reflectors, etc. A given lane may be associated with left and right lane lines or other lane markers that define the boundary of the lane. Thus, most lanes may be bounded by a left edge of one lane line and a right edge of another lane line. As noted above, the map information may store known traffic or congestion information and/or and transit schedules (train, bus, etc.) from a particular pickup location at similar times in the past. This information may even be updated in real time by information received by the computing devices 110.

As an example, the detailed map information may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

The perception system 172 also includes one or more components for detecting objects external to the vehicle such as other vehicles, obstacles in the roadway, traffic signals, signs, trees, etc. For example, the perception system 172 may include one or more LIDAR sensors, sonar or other acoustical devices, radar units, cameras (e.g., video or still, visible light or infrared) and/or any other detection devices that record data which may be processed by computing devices 110. The sensors of the perception system may detect objects and their characteristics such as location, orientation, size, shape, type (for instance, vehicle, pedestrian, bicyclist, etc.), heading, speed, acceleration, rate of change of acceleration, deceleration, rate of change of deceleration, etc. The raw data from the sensors and/or the aforementioned characteristics can be quantified or arranged into a descriptive function, vector, and or bounding box and sent for further processing to the computing devices 110 periodically and continuously as it is generated by the perception system 172.

As discussed in further detail below, computing devices 110 may use the positioning system 170 to determine the vehicle's location and perception system 172 to detect and respond to objects when needed to reach the location safely.

Figure 2:
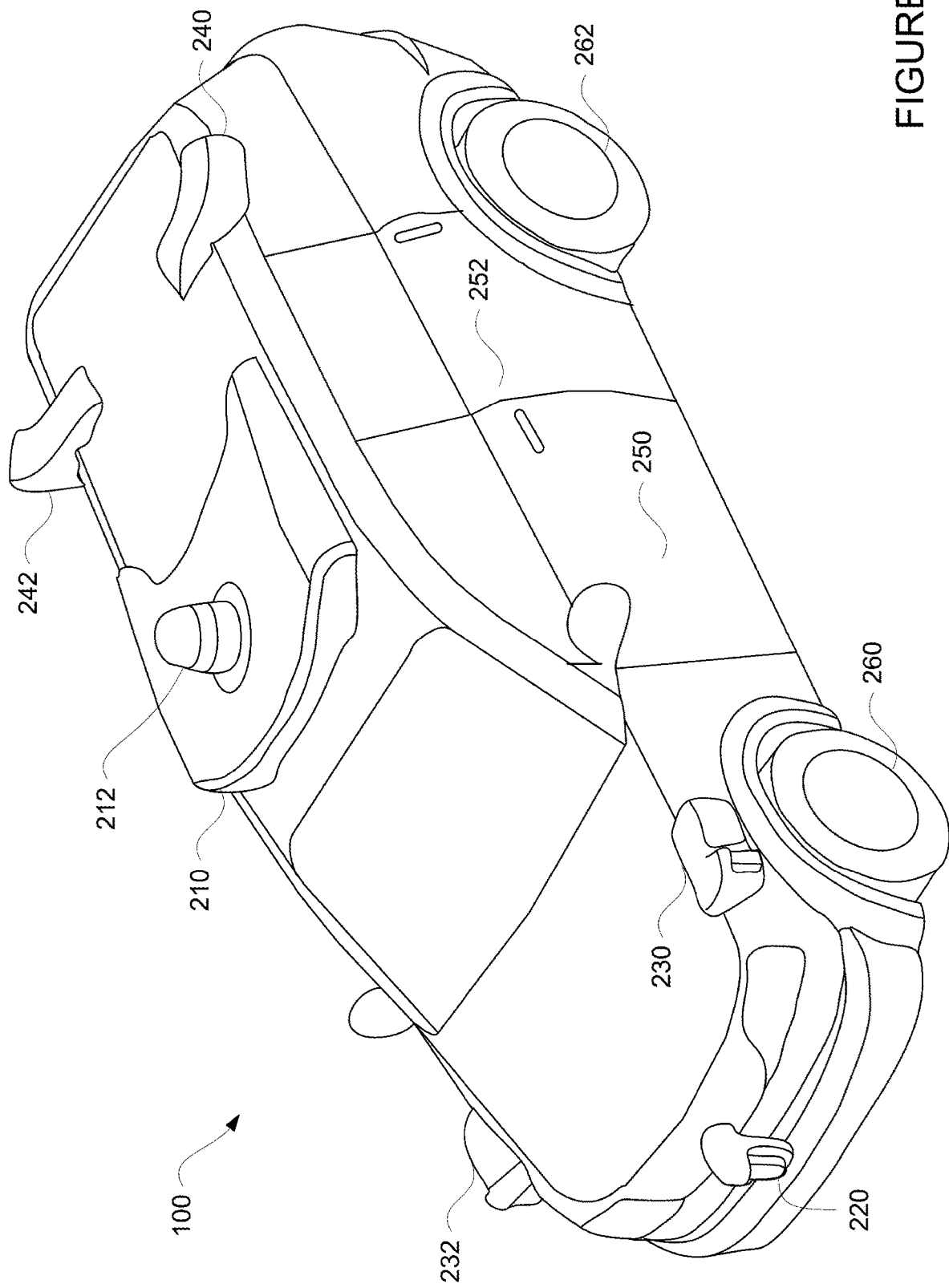
FIG. 2 is an example external view of a vehicle in accordance with aspects of the disclosure.

For instance, FIG. 2 is an example external view of vehicle 100. In this example, roof-top housing 210 and dome housing 212 may include a LIDAR sensor as well as various cameras and radar units. In addition, housing 220 located at the front end of vehicle 100 and housings 230, 232 on the driver's and passenger's sides of the vehicle may each store a LIDAR sensor. For example, housing 230 is located in front of driver door 250. Vehicle 100 also includes housings 240, 242 for radar units and/or cameras also located on the roof of vehicle 100. Additional radar units and cameras (not shown) may be located at the front and rear ends of vehicle 100 and/or on other positions along the roof or roof-top housing 210. Vehicle 100 also includes many features of a typical passenger vehicle such as doors 250, 252, wheels 260, 262, etc.

Figure 3A:
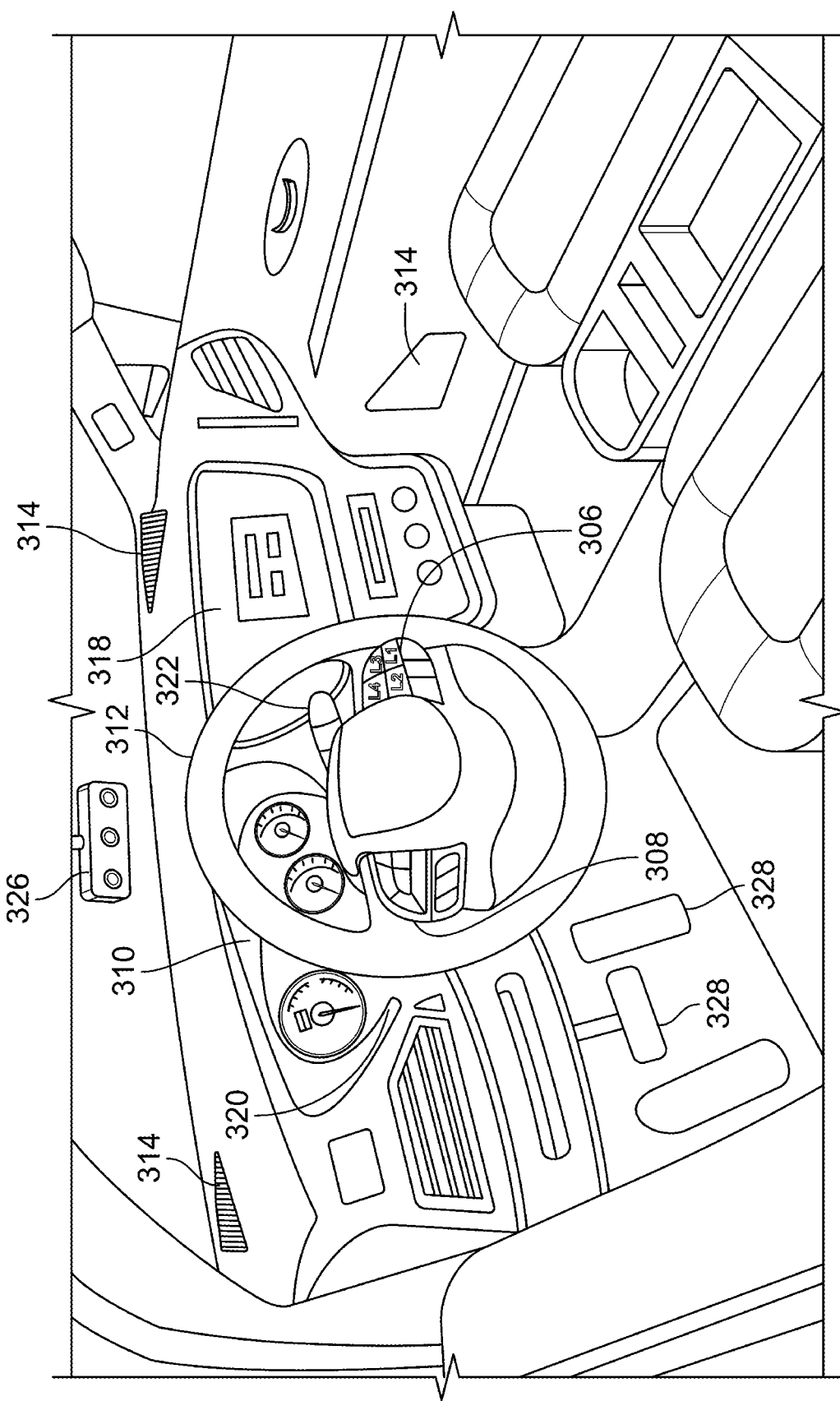
FIGS. 3A and 3B are examples of internal views of vehicles in accordance with aspects of the disclosure.
Figure 3B:
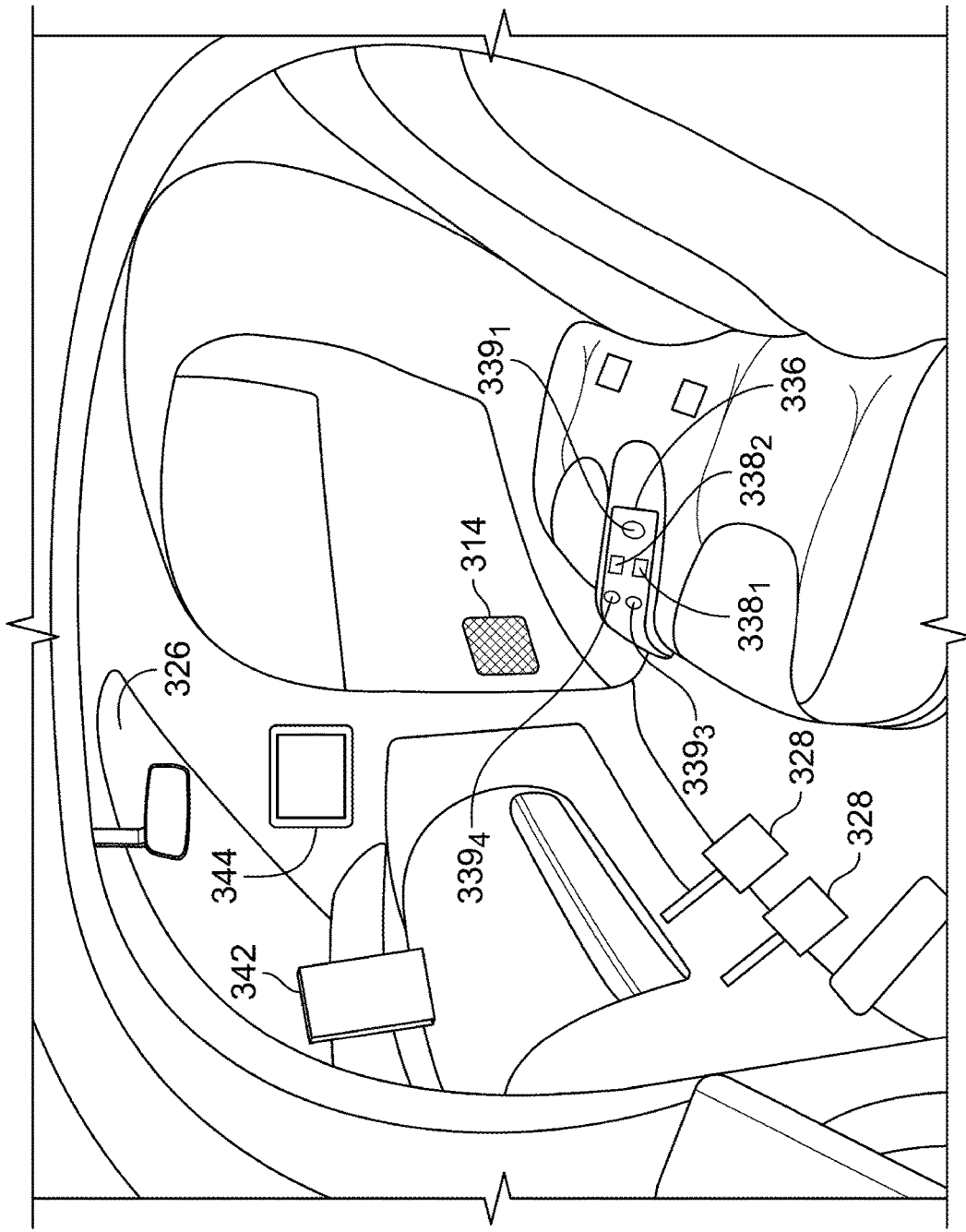

FIGS. 3A and 3B are exemplary internal views or configurations of vehicle 100. As shown in FIG. 3A, the interior 300A includes an area 306 that includes one or more buttons, e.g., buttons L1, L2, L3 and L4. The buttons L1, L2, L3 and L4 may comprise push buttons or toggle buttons. These buttons may be specific buttons set aside for responding to audio comments initiated by ICT task system. They may, however, also comprise buttons associated with other car functionality. In addition to these buttons, area 308 includes a set of buttons that may be used to operate functions associated with the audio system of the car, including volume adjustment, audio mode adjustment (e.g., switch audio source from satellite radio to music player), tuning radio stations, etc., in addition or alternatively to controlling the audio system. In other examples, buttons in area 308 may control features associated with display area 310, which contains a speedometer, tachometer, etc. For example, the buttons in area 308 may allow for switching between display modes in display area 301. Buttons in area 306 (or buttons 306) and buttons in area 308 (or buttons 308) are shown as being located on or adjacent to steering wheel 312, but may be positioned anywhere within convenient and safe reach of an assist driver sitting facing the steering wheel 312 while sitting in the driver's seat.

The interior 300A also includes speakers 314, which can provide music, phone calls, audio requests initiated by computing device 110 or by or through ICT system 172 or other sounds. A screen 318 may also be provided (e.g., a touch sensitive screen). A windshield wiper control arm 320 and a headlight/indicator control arm 322 are also provided proximate steering wheel 312. A video or still camera 326 is also provided so that at least an assist driver riding in the interior of the vehicle may be viewed. Braking and acceleration pedals 328 are also provided and may be used, e.g., to override braking or acceleration settings when the car is operating autonomously or may be used to operate the car in a manual driving mode. Likewise, steering wheel 312 may be engaged by the assist driver when necessary for safe operation of vehicle 100.

FIG. 3B shows another example interior view or configuration 300B of vehicle 100. Here, the interior 300B includes speakers 314, video camera 326 and brake and acceleration pedals 328, which have similar functionality to those discussed in relation to interior 300A. Interior 300B also includes area 336, which as shown includes various buttons and knobs that may be used to select features and/or functions associated with vehicle 100. For example, area 336 may include buttons $338_1$ and $338_2$. These buttons may comprise to buttons L1, L2 discussed above. Other buttons, such as L3, L4 are not shown but may also be provided in area 336. Area 336 may also include various knobs or other actuators $339_1$, $339_2$ and $339_3$. Knobs 339 may control functions such as selection of radio stations, music channels, volume control as well as other functions associated with operation of vehicle 100. User interaction with knobs 339, as well as buttons 338, may be displayed via screens 342, 344. Screens 342, 344 may also comprise touch sensitive screens through which various function associated with the vehicle may be controller, e.g., music selection, volume control, L button operation, windshield wiper operation, etc.

Figure 4:
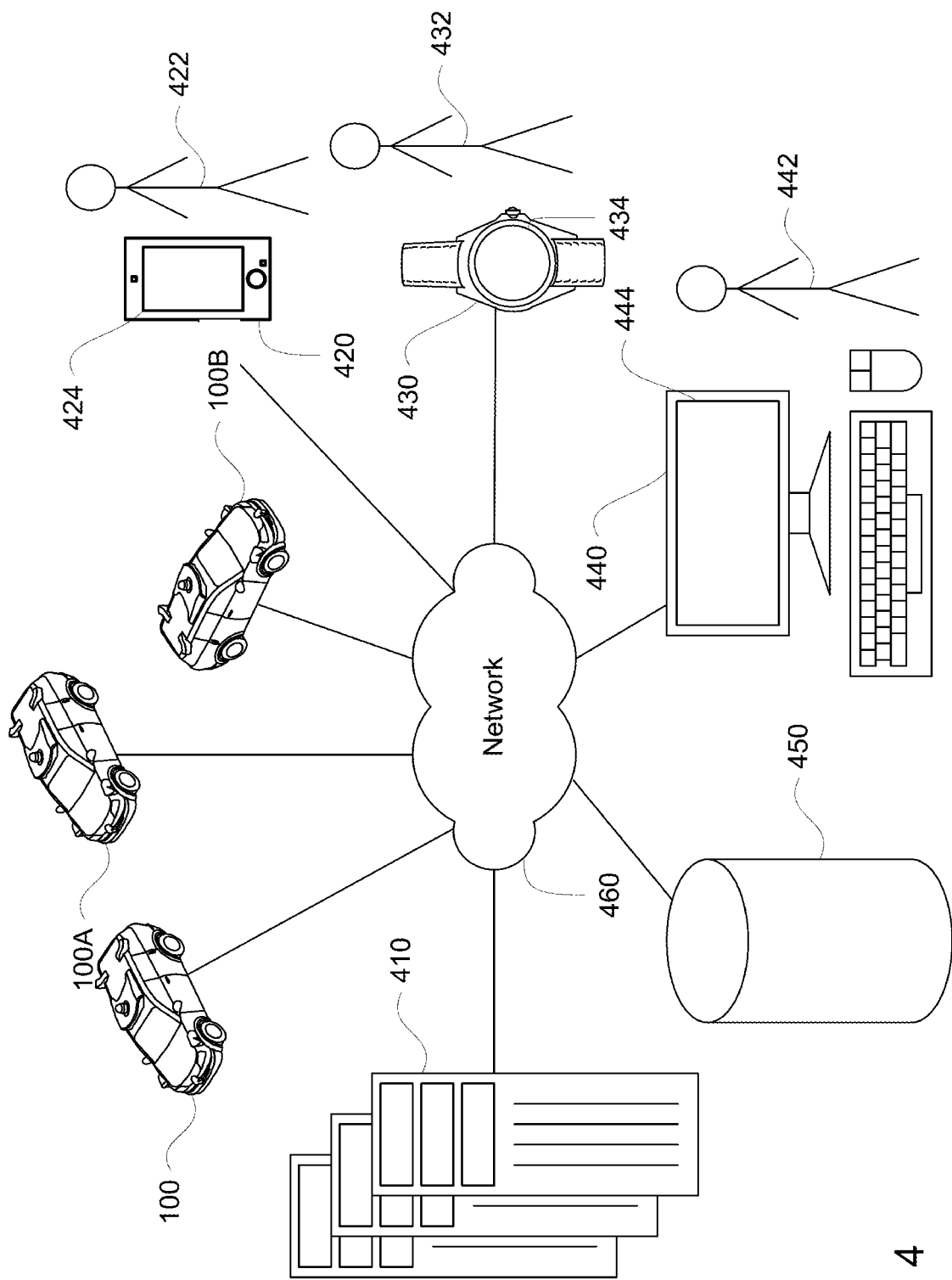
FIG. 4 is an example pictorial diagram of a system in accordance with aspects of the disclosure.
Figure 5:
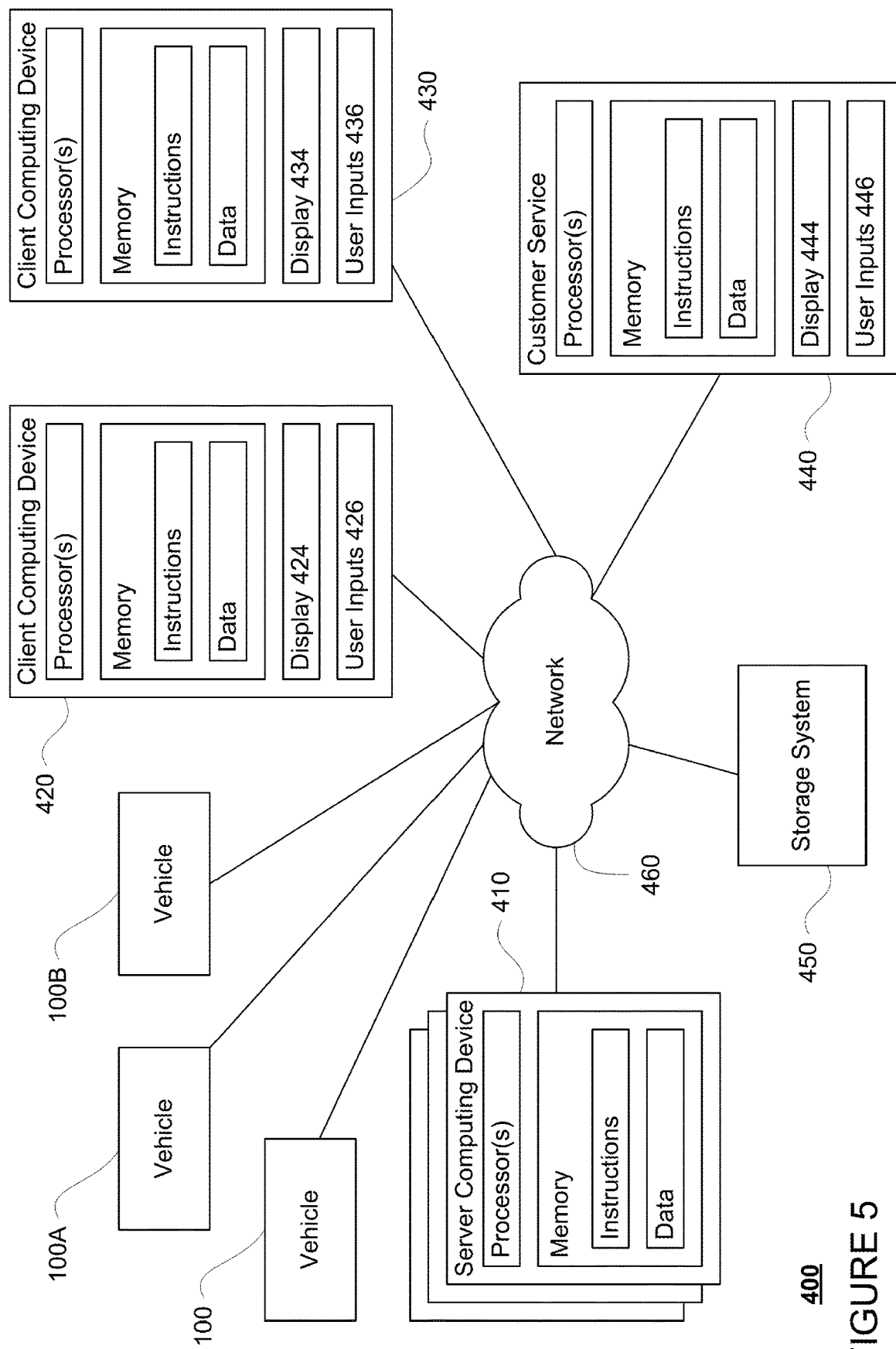
FIG. 5 is an example functional diagram of a system in accordance with aspects of the disclosure.

Computing device 110 of vehicle 100 may also receive or transfer information to and from other computing devices, such as those computing devices that are a part of the transportation service as well as other computing devices, such as those of other vehicles. FIGS. 4 and 5 are pictorial and functional diagrams, respectively, of an example system 400 that includes a plurality of computing devices 410, 420, 430, 440 and a storage system 450 connected via a network 460. System 400 also includes vehicle 100, and vehicles 100A, 100B which may be configured the same as or similarly to vehicle 100. Although only a few vehicles and computing devices are depicted for simplicity, a typical system may include significantly more.

As shown in FIG. 5, each of computing devices 410, 420, 430, 440 may include one or more processors, memory, data and instructions. Such processors, memories, data and instructions may be configured similarly to one or more processors 120, memory 130, data 134, and instructions 132 of computing device 110.

The network 460, and intervening nodes, may include various configurations and protocols including short range communication protocols such as Bluetooth™ Bluetooth™ LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 410 may include one or more server computing devices having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with computing device 110 of vehicle 100 or a similar computing device of vehicle 100A, 100B as well as computing devices 420, 430, 440 via the network 460. For example, vehicles 100, 100A, 100B may be a part of a fleet of vehicles that can send and receive information from the server computing devices 410. In this regard, the server computing devices 410 together may function as a fleet management system, each of the server computing devices functioning to perform one or more roles of the fleet management system. In addition, the server computing devices of the fleet management system may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 4, each client computing device 420, 430, 440 may be a personal computing device intended for use by a user 422, 432, 442, and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), speakers, and user input devices 426, 436, 446 (e.g., a mouse, keyboard, touchscreen or microphone). The client computing devices may also include a camera for recording video streams, speakers, a network interface device, and all of the components used for connecting these elements to one another.

Client computing device 440 may also be a workstation for a customer service representative. In this regard, user 422 may be a customer service representative or dispatcher who can communicate with passengers or assist drivers of the vehicles 100, 100A, and 100B when connected by a server computing device as discussed further below. In addition, the client computing device 440 may enable the user 422 to access information about the vehicles of the fleet stored in the storage system 450, for instance, by communicating with the server computing devices 410 of fleet management system over network 460. Again, although only a single customer service work station is depicted in FIGS. 4 and 5, the system may actually include tens or hundreds of such workstations and customer service representatives.

Although the client computing devices 420, 430, and 440 may each comprise a full-sized personal computing device, they may alternatively comprise mobile computing devices capable of wirelessly exchanging data with a server computing device (such as the server computing devices 410) over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, shown as a smartwatch as shown in FIG. 5. As an example the user may input information using a small keyboard, a keypad, microphone, using visual signals with a camera, or a touch screen.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIGS. 4 and 5, and/or may be directly connected to or incorporated into any of the computing devices 110, 410, 420, 430, 440, etc.

Storage system 450 may store various types of information as described in more detail below. This information may be retrieved or otherwise accessed by one or more server computing devices, such as those of the fleet management system, and/or one or more client computing device, such as the client computing device 440, in order to perform some or all of the features described herein.

In addition, the information of storage system 450 may store information about the status and characteristics of each vehicle of the fleet, as discussed above, as well as the map information discussed above. As the vehicles of the fleet drive around, they may constantly and/or periodically broadcast to one or more of the server computing devices 410 of the fleet management system their status. This may include, for example, whether the vehicle is currently on a trip (e.g., is transporting passengers and/or cargo), a current destination of the vehicle and/or one or more additional future destinations for the vehicle (as discussed further below), whether the vehicle has any maintenance needs, etc. As an example, maintenance needs may include whether the vehicle needs cooling or shade, refueling or charging, cleaning, periodic inspection (after so many hours, trips, or miles in service), recalibration of sensors (to address faults or periodic maintenance), or other maintenance. The one or more server computing devices 410 may store his information in storage system 450.

Storage system 450 may also store information about assist drivers. Such information may include driver profile (age, language spoken, experience level, contact information, etc.), driver shift information (e.g., when the driver shift started/ends, time since last break, etc.). Protections will be put in place to ensure that user privacy remains protected. For example, assist drivers may be required to specifically authorize storage of certain information about themselves. Additional protections include anonymization of personally identifiable information, aggregation of data, filtering of personal information, encryption, hashing or filtering of personal information to remove personal attributes, time limitations on storage of information, or limitations on data use or sharing.

The storage system 450 may also store information about requests for customer service. This information may include, for instance, a type of the request, how the request was originated, a vehicle of the fleet associated with the request, when the request was generated (a timestamp), an associated priority level, whether the request is assigned to a queue (and if so, which if there is more than one queue), whether the request is completed, etc. In addition, the storage system 450 may also be used to store the aforementioned queues and/or the information about the queues as discussed further below.

The storage system 450 may also store information about customer service representatives or dispatchers, such as user 442. This may include information for each customer service representative, such as the number of requests serviced, passenger (or users) of the server which the customer service representative has communicated with previously, as well as characteristics of that customer service representative, such as level of experience, ranking or ratings, skill set, certification, language spoken, or other such characteristics. As with assist drivers, personal information about customer service representatives or dispatchers may also be subject to heightened protections.

In order to provide transportation services to users, the information of storage system 450 may include user account information such as credentials (e.g., identifiers such as a username and password as in the case of a traditional single-factor authentication as well as other types of credentials typically used in multi-factor authentications such as random identifiers, biometrics, etc.) that can be used to identify a user to the fleet management system. The user account information may also include personal information such as the user's name, contact information, identifying information of the user's client computing device (or devices if multiple devices are used with the same user account), one or more unique signals for the user, whether the user has chosen to opt for one or more different predetermined levels of service or otherwise has a need for accessibility services, as well as other user preference or settings data.

As with memory 130, storage system 450 can be of any type of computer storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIGS. 4 and 5 and/or may be directly connected to or incorporated into any of the computing devices 110, 410, 420, 430, 440, etc.

Example Methods

Figure 6:
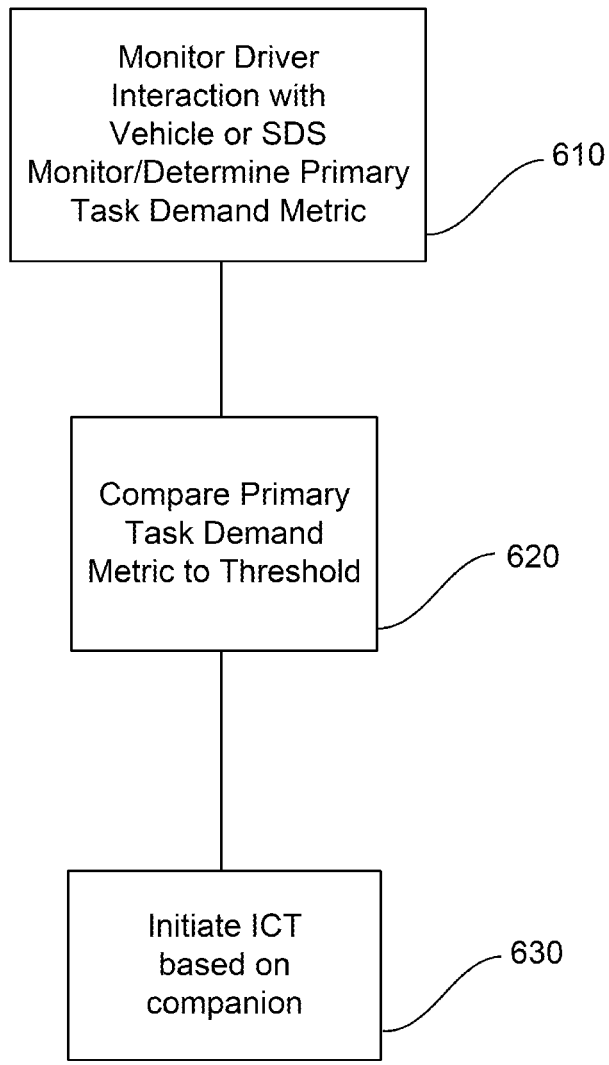
FIG. 6 is an example flow diagram in accordance with aspects of the disclosure.

In addition to the operations described above and illustrated in the figures, various operations will now be described. It should be understood that the following operations do not have to be performed in the precise order described below. Rather, various steps can be handled in a different order or simultaneously, and steps may also be added or omitted. For instance, FIG. 6 is an example flow diagram 600 that may be performed by one or more processors, such as one or more processors of computing devices 110 in vehicles 100, 100A, or 100B, in order to monitor and mitigate driver fatigue in one or more of vehicles 100, 100A and/or 100B. The flow diagram 600 may be performed as a process on server 410. In such an implementation each car could provide data to server 401 so that the server would then perform the process of flow diagram 600 to administer the ICT in combination with other consideration such as for example time of day, driver experience, time since last ICT or as further described throughout.

As shown in block 610 of FIG. 6, computing device 110 monitors driver interactions with the vehicle or SDS. These interactions include performance of primary tasks associated with operation of the vehicle or secondary or ICT tasks initiated by the computing device 110 or the SDS to stimulate interaction by the driver. The primary tasks may include a driver providing a comment relating to the operation of the vehicle, a driving quality assessment or the vehicle being use to carry a passenger to a destination. Secondary tasks or ICTs generally include tasks that engage a driver's motor skills or cognitive skills. Motor skills comprise acts that involve muscle use, such as for example, pressing a button, toggling a rocker switch, limb movement, etc. Cognitive skills are based on the use of the brain and may require one or more of thinking, reading, remembering, reasoning or paying attention. As an example, cognitive skills are invoked in response to a request to perform an act such as pressing a specific button as it involves thinking about the request, remembering it and focusing one's attention long enough to complete the requested act.

The computing device may measure the performance of primary tasks and/or secondary tasks using a primary task demand metric. The primary task demand metric can comprise a measurement of distance travelled and/or time travelled since a primary task or secondary task was last performed by an assist driver. The distance measurement may be accumulated by a counter linked to the vehicle's system that tracks distance travelled. The counter may then provide the distance travelled to the computing device 110. Alternatively, the vehicle system may provide the signals to computing device 110, which may itself implement a distance counter. Time travelled can be tracked using a timer implemented via computing device 110 or having a timer that feeds its output to computing device 110. Computing device 110 may receive counter or timer information by periodically polling devices that perform those functions or via a connection that provides such information in real time. The primary task demand metric may comprise a measurement of both primary task performance and secondary task performance. The metric, however, may only comprise a measure of either primary tasks or secondary tasks. In addition, two separate demand metrics may be tracked by the computing device, e.g., a secondary task only metric or a primary task only metric.

As shown at block 620 of FIG. 6, the primary task demand metric measured is compared to a threshold. In an example where the primary task demand metric includes a measurement of both distance and time, in one scenario the distance threshold may be set to 10 miles and the time threshold may be set to 20 minutes. The distance threshold may incorporate some level of randomness and vary for example by +/−3 miles (e.g., up to 30% variance). For example, if the distance threshold is initially set to 10 miles, when a task is performed it may then be reset to 7 miles, when a subsequent task is received after the reset the threshold may then be set back 10 miles, then reset thereafter to 13 miles, etc. Introducing randomness aids in avoiding training the driver to circumvent the system by knowing the exact time period or distance that tasks need to be completed.

The time threshold may be a hard time limit to account for situations where, for example, it may take too long of a time to traverse a given distance due to traffic patterns such that the distance threshold might prove to not be a useful threshold. In addition, a measure of randomness may be introduced with respect to the timing threshold similar to that discussed above in relation to the distance threshold. For example, there may be up to a 30% (or more) variance in the timing threshold If the distance or time travelled since either a primary task or secondary task was performed meets or exceeds the respective threshold, as shown at block 630 of FIG. 6, the computing device 110 initiates a secondary task or ICT for completion by the driver. For example, the computing device 110 may initiate a request through speakers 314 for the driver to "please press the L2 button." The driver is then given a predetermined time, e.g., 10 seconds, to complete the requested action. Depending on the driver's response additional ICTs may be issued, countermeasures may be invoked if it is determined that the driver is fatigued, or the system may reset the counters and start the monitoring process at block 610.

As discussed above, the primary task demand metric includes as a component monitoring of the performance of primary task. As such, initiation of ICTs or secondary tasks will vary dynamically in relation to the frequency at which primary tasks are performed. For example, where the driving context requires regular interaction with the vehicle or SDS within time or distance threshold limits (e.g., the demand for primary task performance is relatively high), ICTs will not be issued. In contrast, when the demand for the performance of primary tasks is low, ICTs will be issued more regularly. Thus, secondary task demand varies dynamically in relation to primary task demand. In this regard, in an aspect of the disclosure secondary task demand increases in inverse proportion to primary task demand. This allows for more effective counteraction of different levels of fatigue. In addition, a system implemented in accordance with this disclosure maybe safer as primary task demands are not initiated or issued when drivers are highly engaged (e.g., primary task demand is high).

The system may also dynamically manage and mitigate passive fatigue by adapting the complexity of ICT or secondary tasks or frequency at which tasks are initiated based on the driving context and other factors. For example, factors such scene understanding (e.g., the location and movement of external objects within a vicinity of the vehicle), the terrain or route being travelled, the driver profile, weather conditions, speed of the vehicle, time of day, traffic conditions, etc. In effect, these factors may impact the driver context and thereby require different levels of vigilance or attention by the driver. For example, if perception system 172 indicates that the scene in the vicinity of the vehicle include multiple objects such that vehicle in a complex environment, the timing and complexity of ICTs may be adjusted to accommodate for such an environment. As another example, if vehicle is on relatively long trip, the frequency and complexity of ICTs may increase in proportion to distance travelled or length of time on the trip. As another example, nighttime driving may also require that the frequency and complexity of ICTs increase. The foregoing factors may be taken into account in setting the distance and time thresholds discussed above and set by server 410 or a dispatcher.

Examples of more complex ICTs may include a sequence in which more than one button is operated, e.g., press L2 once, L3 twice, and L4 three times. As another example, an ICT may include a request to tune the radio to a particular station frequency. Other examples include operating the windshield wiper, opening a particular window, etc. As another example, as the SDS is able to sense the environment, an ICT may comprise asking a driver to report or describe scenes or objects in their driving environment. Poor performance on such an ICT may provide an indication of poor vigilance due to fatigue or distraction. As long as computing device 110 is able to be receive information indicating that the task requested was completed, any feature of the vehicle that won't impact the safe operation of the vehicle may be used in an ICT. In that regard, any ICT that provides cognitive engagement that mitigates fatigue may be used.

Figure 7A:
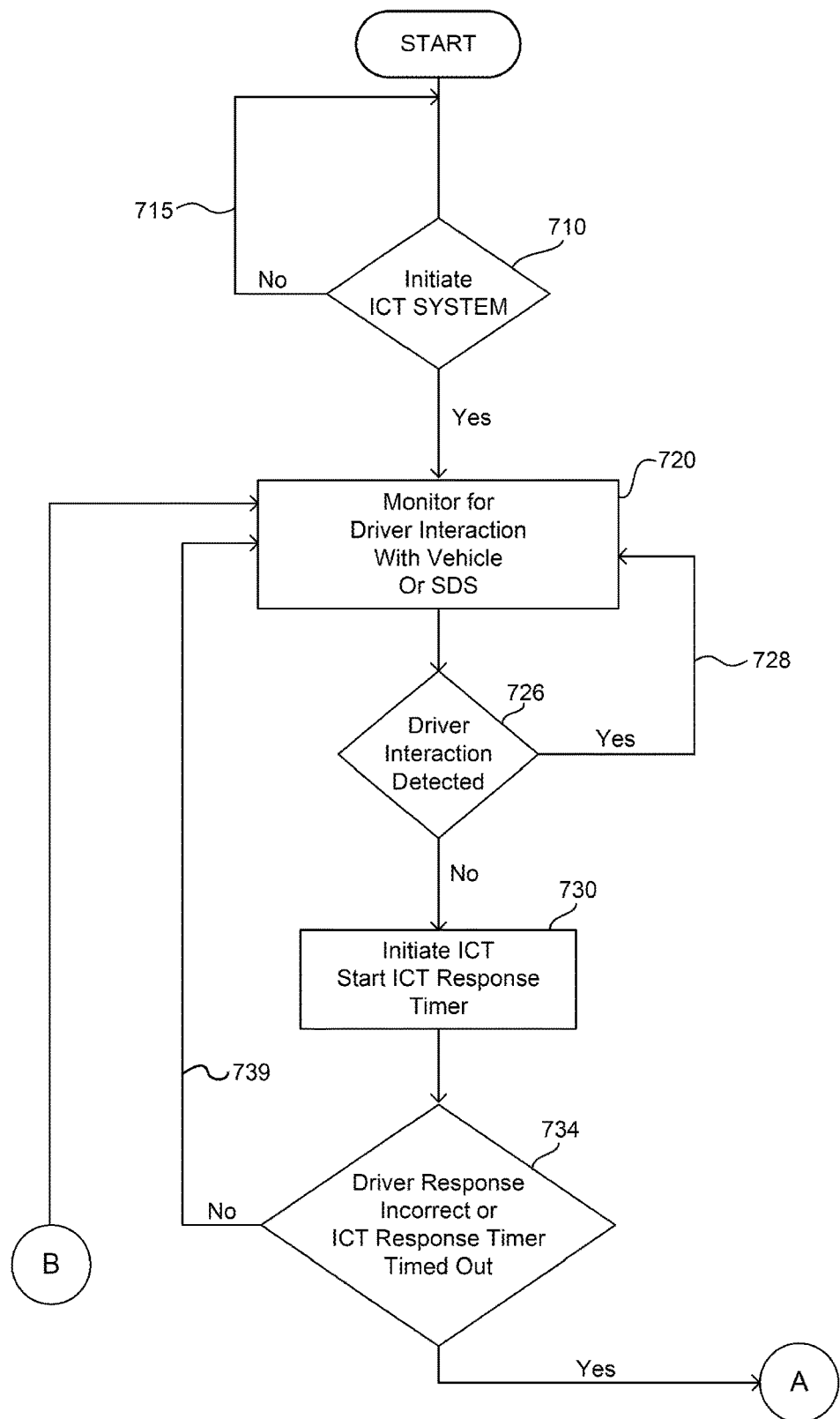
FIGS. 7A and 7B is an example flow diagram in accordance with aspects of the disclosure.
Figure 7B:
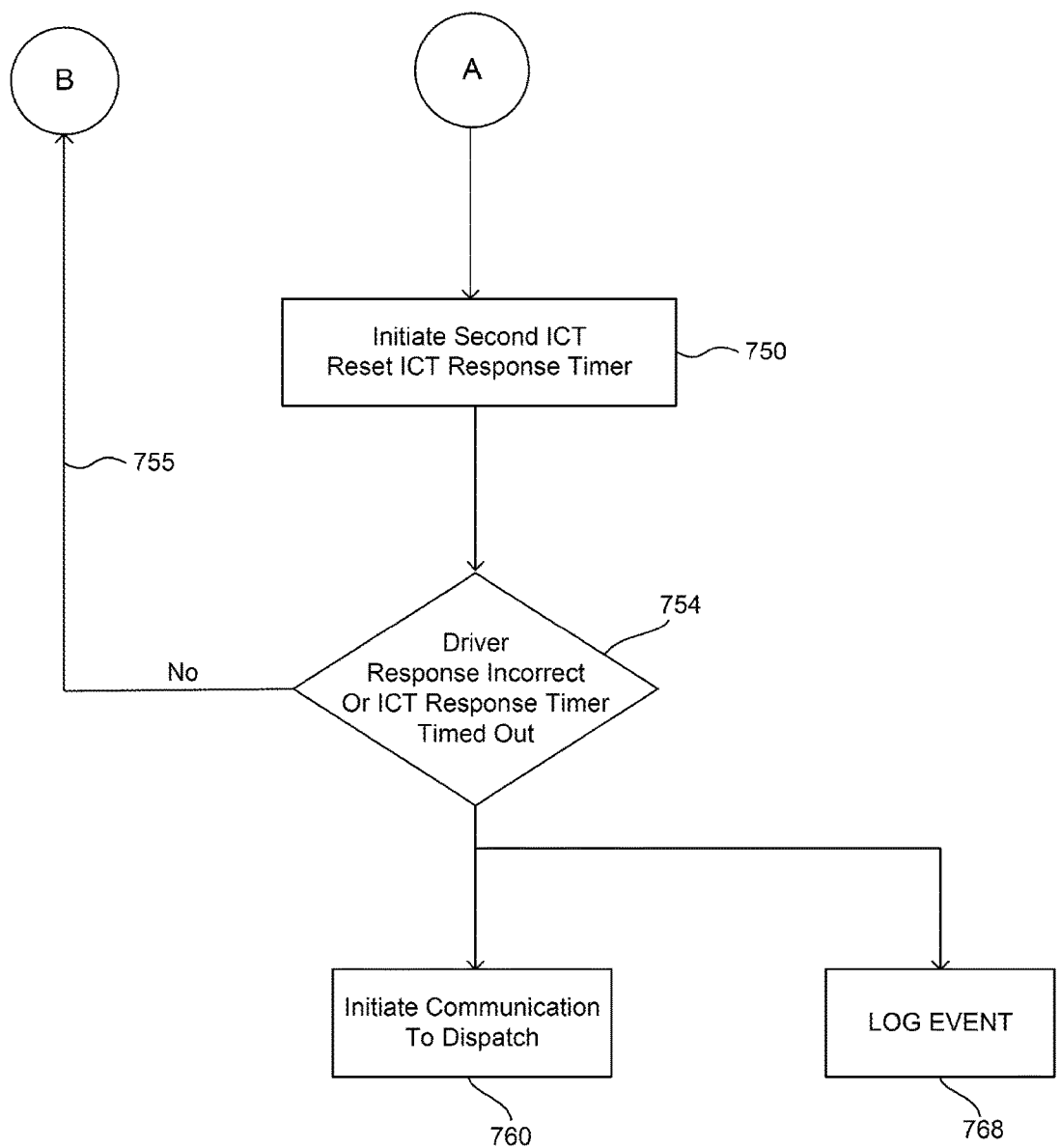

In another instance, FIGS. 7A and 7B is a further example flow diagram 700 with operations that may be performed by one or more processors, such as one or more processors of computing devices 110 in vehicles 100, 100A, or 100B in order to monitor and mitigate driver fatigue in one or more of vehicles 100, 100A and/or 100B. As shown at block 710 of FIG. 7A, computing device 110 determines at diamond 710 whether to initiate the ICT system. In making this determination, the processing device may determine whether the vehicle is moving, whether the parking brake is released whether there are dual drivers, whether passengers are present in the interior of the vehicle, whether the vehicle is in manual mode or a partially autonomous mode, or whether there is no assist driver. For example, if the vehicle is stationary or not moving processing returns to diamond 710 via line 715. On the other hand, if the vehicle is moving, processing proceeds to block 720. Similarly, if the parking brake is released, the process proceeds to block 720. Likewise, if the other parameters indicate that the ICT system should be engaged because there is a single assist driver in the vehicle, there are no passengers in the vehicle, and that the car is not in manual mode, processing proceeds to block 720. In this regard, where another driver or passenger is in the vehicle, the ICT system may not need to be engaged as the expectation is that by having another person in the interior of the vehicle the assist driver will most likely be more vigilant and attentive. The ICT system may also shut off when the car nears a passenger pick up location or once the car goes into park at the passenger pick up location.

With ICT system initiated at block 720, the computing device 110 monitors the SDS for driver interaction or receives information from the SDS indicative of driver interaction with the SDS, starts a distance counter and monitor timer. As discussed above, the interaction may comprise a primary task or a secondary task/ICT.

As indicated at diamond 726, if appropriate driver interaction is detected before the distance counter or monitor timer reaches respective distance or time thresholds, the process returns to block 720, via line 728, where the distance counter and monitor timer are reset. As discussed above, appropriate driver interaction includes either performance of primary task or a secondary task. If no driver interaction is detected before the distance counter or monitor timer reach their thresholds, then processing proceeds to block 730. As noted above, the time thresholds will typically be set to a hard time limit. This is to account for situations where it may take a much longer time to traverse a given distance due to traffic patterns and the distance threshold may not be as useful.

At block 730, a first ICT or secondary task is initiated by computing device 110 and an ICT response timer is started. For example, a driver may be requested to "press the L2 button." That driver then has a predetermined time period, e.g., 10 to 30 seconds, to record a response with time being measured by the ICT response timer.

If, as indicated at diamond 734, the driver provides a correct response before the ICT response timer times out, then processing returns to block 720 as indicated via line 739. On the other hand, if the driver provides an incorrect answer or the ICT response timer times out, processing proceeds to block 750 in FIG. 7B.

At block 750, a second ICT or secondary task is initiated and the response timer is reset. The second ICT will typically be different than the first ICT. For example, it may request, "please press the L3 button." If, as indicated at diamond 754, the driver provides a correct response before the response times out, then processes returns to block 720 as indicated via line 755. On the other hand, if the driver provides an incorrect answer or the response timer times out, processing proceeds to block 760.

At block 760, the computing device may initiate communication or cause a communication to be sent to a dispatcher. The communication may be an email, text message or a phone call. The dispatcher may then reach out to the driver to inquire the driver's level of alertness and suggest that they employ countermeasures to enhance alertness, e.g., breaks, stretching, etc. Note also that if the second ICT fails to garner a timely and correct response, the event will be logged at block 768.

While block 760 indicates that a communication will be initiated to a dispatcher in the event the second ICT is not timely responded to, note that the system may loop through the process with a third ICT in some examples, and in other examples, other countermeasures may be employed prior to, or in addition to, contacting the dispatcher. For example, the volume of the radio or music player in the vehicle may be increased to a level that should wake even a sleeping person. Alternatively, the driver's side window may be opened enough to let in additional outside air or the horn may be engaged. In essence, any vehicle feature that is accessible via the SDS that won't affect vehicle operation or compromise the safety of the driver (or passengers) may be initiated to obtain the attention of the assist driver. If such countermeasures are employed, then additional steps may be added to flow 700 including initiating additional ICTs and waiting for a response. Ultimately, however, if no response is forthcoming, then a dispatcher would be contacted.

Figure 8:
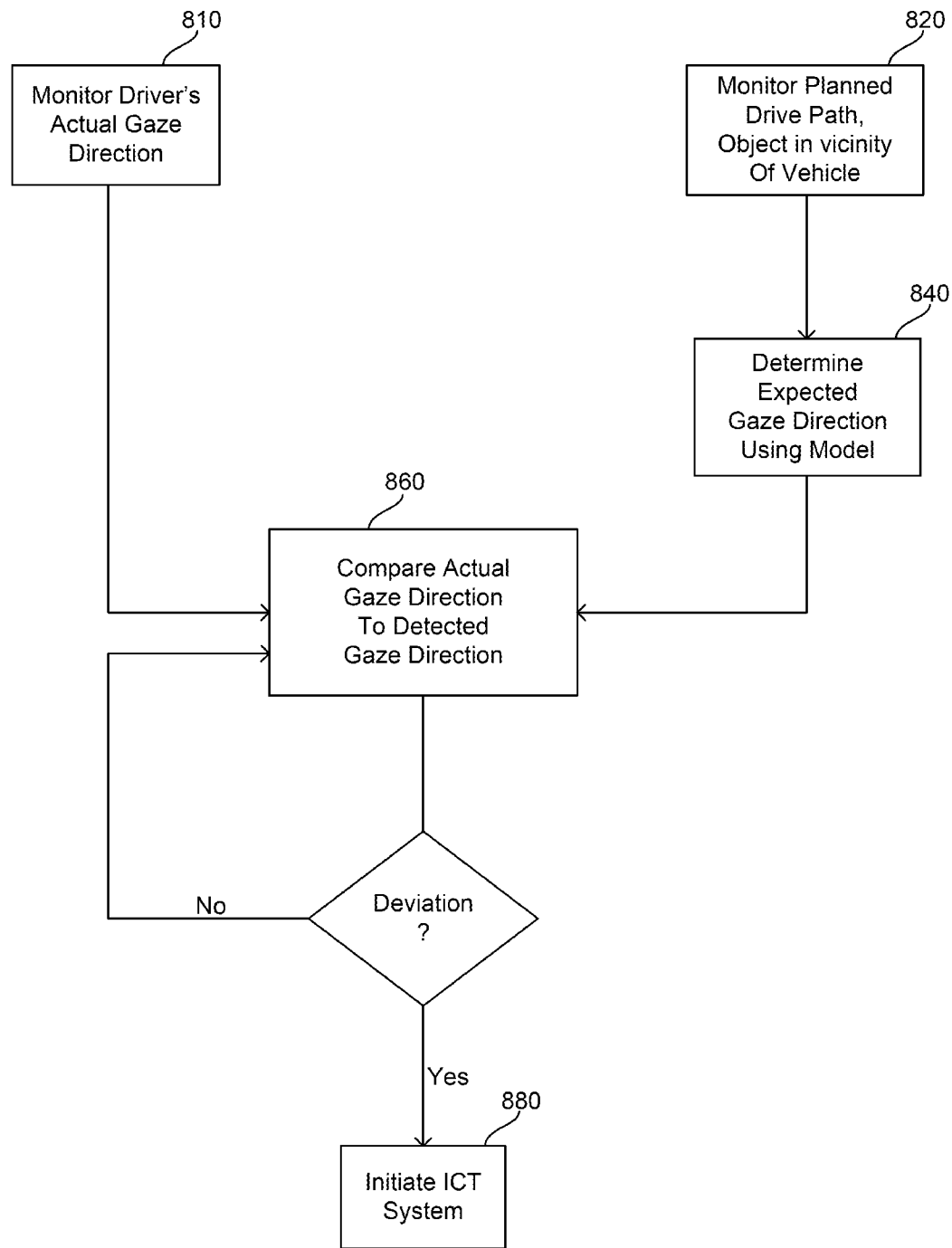
FIG. 8 is an example flow diagram in accordance with aspects of the disclosure.

In another instance, example flow diagram 800 as shown in FIG. 8 illustrates a further scenario that may be performed by one or more processors, such as one or more processors of computing devices 110 in vehicles 100, 100A, or 100B, in order to detect potential driver fatigue in one or more of vehicles 100, 100A and/or 100B. At block 810, an actual gaze direction (or pattern of gaze direction) of the driver is monitored, using for example the camera 326 of FIG. 3. Camera 326 may be focused on one or both of the driver's eyes such it captures digital images of the eye(s). Computing device 110 may then use the digital image information to calculate the actual eye gaze direction of the driver. In parallel, at block 820, the computing device or SDS may receive information that about the planned drive path and objects in the vicinity of the vehicle along the drive path. The measured gaze direction and location surrounding objects can then be combined to determine what object the driver is looking at. Where a driver is wearing sunglasses, emitters may be selected such the wavelength of light, e.g., infrared, passes through the sunglasses. Otherwise, proper placement of the camera should allow for capture of the driver's gaze direction.

At block 840, information about the planned drive path and objects are used to determine an expected or normative gaze direction or pattern as defined by a normative scanning model. The normative gaze direction or pattern may be considered an optimal gaze direction in some circumstances, e.g., where there is sufficient confidence in the model. The normative scanning model may be determined based on a visual scanning model developed from actual human scanning data and/or based on environmental statistics. A fundamental role of visual scanning in driving is to reduce uncertainty of a planned or predicted driving path. This uncertainty may be divided into (1) uncertainty regarding driving path and (2) uncertainty regarding location and movement of objects external to the vehicle in relation to the drive path. For a given driving situation, a strategy may be employed for visually scanning the environment that works to minimize uncertainty regarding traversing the planned path. Such strategy may be determined by the statistical properties of the driving context (e.g., locations at which other objects may appear, their speed, their behavior, etc.). For example, if a driver is making a left onto two lane road, the driver will look left and right at least once. Human drivers learn these statistical properties over time through experience and, thus, the normative scanning model may be derived based on visual scanning patterns recorded from experienced attentive drivers. These statistical properties may also be estimated from data that is collected as part of SDS fleet management platform and used to derive an expected visual scanning model for a specific driving situation or context, without the use of human data, based on the principle that optimal scanning will minimize uncertainty relative to the planned path in the given scenario. The scanning model is used to derive an expected gaze direction or pattern given the driving context, given an expected drive path and objects along the drive path.

At block 860, the expected gaze direction or pattern may then be used as a benchmark and compared to the actual gaze direction or pattern detected by camera 326. If there is deviation between the actual gaze direction or pattern and the benchmark, then at block 880 the ICT system may be initiated as previously discussed to initiate ICT requests to the driver. A deviation between a driver's actual visual scanning pattern and that prescribed by the expected model indicates a reduced ability to properly allocate attention to support safe driving, which may be related to (among other things) driver distraction, fatigue or over-reliance on automation (e.g., a test driver not scanning the road properly as they started to over-trust the vehicle operating in an autonomous driving mode).

The foregoing disclosure was discussed in the context of a self-driving system. Note, however, that the foregoing methods and processes may be implemented in non-SDS scenario. For example, the vehicle in FIG. 3A may be operated in a manual mode while the ICT system is fully engaged. In this the method steps of FIGS. 6 through 8 may be implemented and practiced to mitigate possible driver fatigue as the vehicle is operated manually.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A dynamic interactive cognitive task method for a self-driving system, comprising:
    determining, by one or more processors of the self-driving system, a primary task demand metric associated with a primary task including a measurement of a first parameter and a second parameter;
    comparing, by the one or more processors, the primary task demand metric to a first threshold value for the first parameter and a second threshold value for the second parameter; and
    triggering, by the one or more processors, the self-driving system to initiate an interactive cognitive task to a driver of the self-driving system based on a result of the comparing.

2. The dynamic interactive cognitive task method of claim 1, wherein the primary task demand metric further includes a value associated with one of a comment by the driver, a comment rating, or a request for use of the self-driving system for a passenger of the self-driving system.

3. The dynamic interactive cognitive task method of claim 1, wherein the first threshold value comprises a time threshold value of at least 10 minutes.

4. The dynamic interactive cognitive task method of claim 1, wherein the second threshold value comprises a distance threshold value of at least 10 miles.

5. The dynamic interactive cognitive task method of claim 1, wherein the interactive cognitive task requires a response from the driver.

6. The dynamic interactive cognitive task method of claim 5, wherein the response from the driver includes use of a motor skill and a cognitive skill.

7. The dynamic interactive cognitive task method of claim 1, wherein triggering the interactive cognitive task comprises generating a voice request for the driver to complete a non-visual button push task.

8. The dynamic interactive cognitive task method of claim 1, further comprising monitoring, by the self-driving system, for a response from the driver to the initiated interactive cognitive task and issuing a follow-up interactive cognitive response if there is no response within a predetermined time limit.

9. The dynamic interactive cognitive task method of claim 1, further comprising determining complexity of the interactive cognitive task based on at least a complexity of the primary event.

10. The dynamic interactive cognitive task method of claim 1, wherein a frequency associated with triggering the self-driving system to initiate the interactive cognitive task is adjustable based on the result of the comparison.

11. The dynamic interactive cognitive task method of claim 1, further comprising cancelling the interactive cognitive task if another primary task event is detected by the self-driving system within a time limit.

12. The dynamic interactive cognitive task method of claim 1, wherein the primary task demand metric comprises at least one of a time travelled by the self-driving system or a distance traveled by the self-driving system.

13. A dynamic interactive cognitive task method for a self-driving system, comprising:
    monitoring, by one or more processors of the self-driving system, a primary task demand metric associated with at least one primary task including a measurement of a first parameter and a second parameter;
    comparing, by the one or more processors, the monitored primary task demand metric to a first threshold value for the first parameter and a second threshold value for the second parameter; and
    initiating, by the one or more processors, using the self-driving system an interactive cognitive task based on a result of the comparing.

14. The dynamic interactive cognitive task method of claim 13, wherein the primary task demand metric further includes an elapsed time since performance of a primary task demand event by a driver of the self-driving system.

15. The dynamic interactive cognitive task method of claim 13, wherein the primary task demand metric further includes a distance travelled since performance of a primary task demand event by a driver of the self-driving system.

16. The dynamic interactive cognitive task method of claim 15, wherein the primary task demand metric further includes one of a comment by the driver, a comment rating, or a request for use of the self-driving system for a passenger.

* * * * *